(12) United States Patent
Lee et al.

(10) Patent No.: US 11,833,738 B2
(45) Date of Patent: Dec. 5, 2023

(54) DISPLAY PROTECTOR ATTACHING APPARATUS FOR SMART DEVICE

(71) Applicant: Whitestone Co., Ltd., Cheonan (KR)

(72) Inventors: Soongwon Lee, Cheonan (KR); Sungho Im, Cheonan (KR)

(73) Assignee: Whitestone Co., Ltd., Cheonan-si (KR)

( * ) Notice: Subject to any disclaimer, the term of this patent is extended or adjusted under 35 U.S.C. 154(b) by 0 days.

(21) Appl. No.: 17/711,805

(22) Filed: Apr. 1, 2022

(65) Prior Publication Data

US 2022/0314529 A1 Oct. 6, 2022

(30) Foreign Application Priority Data

Apr. 6, 2021 (KR) .................. 10-2021-0044802

(51) Int. Cl.
*B29C 63/00* (2006.01)
*B29L 31/34* (2006.01)

(52) U.S. Cl.
CPC ...... *B29C 63/0004* (2013.01); *B29C 63/0047* (2013.01); *B29C 2063/0008* (2013.01); *B29L 2031/3475* (2013.01)

(58) Field of Classification Search
CPC ........ B29C 2063/0008; B29C 63/0004; B29C 63/0047; B29C 63/02; H04M 1/0266; H04M 1/185; G06F 1/1626; G06F 1/1637; G06F 2200/1633; G06F 2200/1634; B29L 2031/3475

See application file for complete search history.

(56) References Cited

FOREIGN PATENT DOCUMENTS

KR 10-2019-0014824 A 2/2019
KR 10-2114926 B1 5/2020

OTHER PUBLICATIONS

English translation of JP2019032502.*
English translation of KR102114926.*
English translation of Notice of Refusal for JP2022062942.*

* cited by examiner

*Primary Examiner* — Sonya M Sengupta
(74) *Attorney, Agent, or Firm* — Heedong Chae; Lucem, PC

(57) ABSTRACT

Disclosed is a display protector attaching apparatus for a smart device. The display protector attaching apparatus for the smart device includes a base part provided with a body coupling hole to which a smart device is coupled and a smart device fixing protrusion; and a lifting support part which is detachably coupled to a lifting coupling part provided in the base part to support a display protector to be attached to the smart device, wherein when the lifting support part is separated from the lifting coupling part, the display protector is dropped on the display of the smart device provided with a liquid adhesive member to be attached to the display, and the lifting coupling part is provided to be position-adjusted in the base part so that the lifting support part adjusts a position supporting the display protector.

10 Claims, 7 Drawing Sheets

DISPLAY PROTECTOR ATTACHING APPARATUS FOR SMART DEVICE

CROSS-REFERENCE TO RELATED APPLICATIONS

This application claims the priority of Korean Patent Application No. 10-2021-0044802 filed on Apr. 6, 2021, in the Korean Intellectual Property Office, the disclosure of which is incorporated herein by reference.

BACKGROUND OF THE INVENTION

Field of the Invention

The present disclosure relates to display protector attaching apparatus and attaching method for a smart device, and more particularly, to liquid crystal screen protector attaching apparatus and attaching method for a smart device capable of easily and effectively attaching a display protector to a display of a smart device using a liquid adhesive member.

Description of the Related Art

A recent smart device (Mobile/Tablet) is a high-priced product and has a structure for protecting a touch panel by applying a display part, i.e., a flat or 2.5D, 3D cover glass to a front surface thereof. Such a cover glass has a high risk to be damaged or broken by factors such as physical impact or drop.

When the cover glass is damaged or broken, about 30% to 40% of the cost of the smart device is required during repairing, and it takes a significant time of at least 2 hours to 2 days for repair. Further, the appearance is not good, and the surface is sharp to cause injury and malfunction.

However, when the cover glass of the smart device is damaged or broken, the smart device is frequently used with the aforementioned inconvenience and risk due to high repair costs, and small damage such as scratches is often ignored.

Therefore, there is a need for improvements that allow general consumers to easily attach a protective glass or protective film to the display of the smart device.

The above-described technical configuration is the background art for helping in the understanding of the present disclosure, and does not mean a conventional technology widely known in the art to which the present disclosure pertains.

SUMMARY OF THE INVENTION

Therefore, an object to be achieved by the present disclosure is to provide display protector attaching apparatus and attaching method for a smart device capable of easily and efficiently attaching a display protector to a display of the smart device using a liquid adhesive member.

According to an aspect of the present invention, there is provided a display protector attaching apparatus for a smart device including a base part provided with a body coupling hole to which a smart device is coupled and a smart device fixing protrusion; and lifting support part which is detachably coupled to a lifting coupling part provided in the base part to support a display protector to be attached to the smart device, wherein when the lifting support part is separated from the lifting coupling part at a point met with the display protector by inclining the base part using an inclined protrusion provided on the bottom of the base part to move a liquid adhesive member, the display protector is dropped on the display of the smart device provided with the liquid adhesive member to be attached to the display, and the lifting coupling part may be provided to be position-adjusted in the base part so that the lifting support part may adjust a position supporting the display protector.

A protrusion provided on the bottom of the lifting coupling part may be coupled to a first coupling groove selected from a plurality of first coupling grooves provided in the base part so that the lifting coupling part may be position-adjusted in the base part.

The lifting coupling part may include a coupling body which is detachably coupled to a first coupling groove selected from the plurality of first coupling grooves provided in the base part; and a support part coupling groove which is provided in the coupling body and detachably coupled with the lifting support part.

The lifting support part may include a support body which is slidably coupled to the support part coupling groove provided in the lifting coupling part; a handle portion which is provided at an end of the support body to be provided as a handle of a user; and a pair of elastic bars which is provided at an edge of the support body to be elastically supported to a wall portion of the support part coupling groove.

The lifting support part may further include an extension portion which is provided in the support body to support the display protector, wherein the extension portion may be provided with a wider width than the support body, and the pair of elastic bars may be provided in the support body between the extension portion and the handle portion.

The base part may include a base body provided with the body coupling hole and the smart device fixing protrusion; and an inclined protrusion which is provided on the bottom of the base body to incline the base body.

The base part may further include a plurality of align protrusions provided on the base body.

A support receiving groove may be provided in the base body of the base part, and a container support supporting a container member may be received in the support receiving groove.

The display protector attaching apparatus for the smart device may further include a container support which is detachably coupled to a second coupling groove provided in the base part; a container member which is detachably coupled to the container support to store the liquid adhesive member dropped on the display; and an absorption pad which is attached or coupled to the base part.

According to the embodiments of the present disclosure, a lifting coupling part is provided to be position-adjusted on a base part to adjust the position where a lifting support part supports a display protector, thereby easily and effectively attaching the display protector to the display of the smart device.

In addition, a plurality of elastic bars is provided in the lifting support part to prevent the loss or unintended detachment of the lifting support part.

Furthermore, a container support may be received in a support receiving groove provided in the base part, thereby improving the convenience of use.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
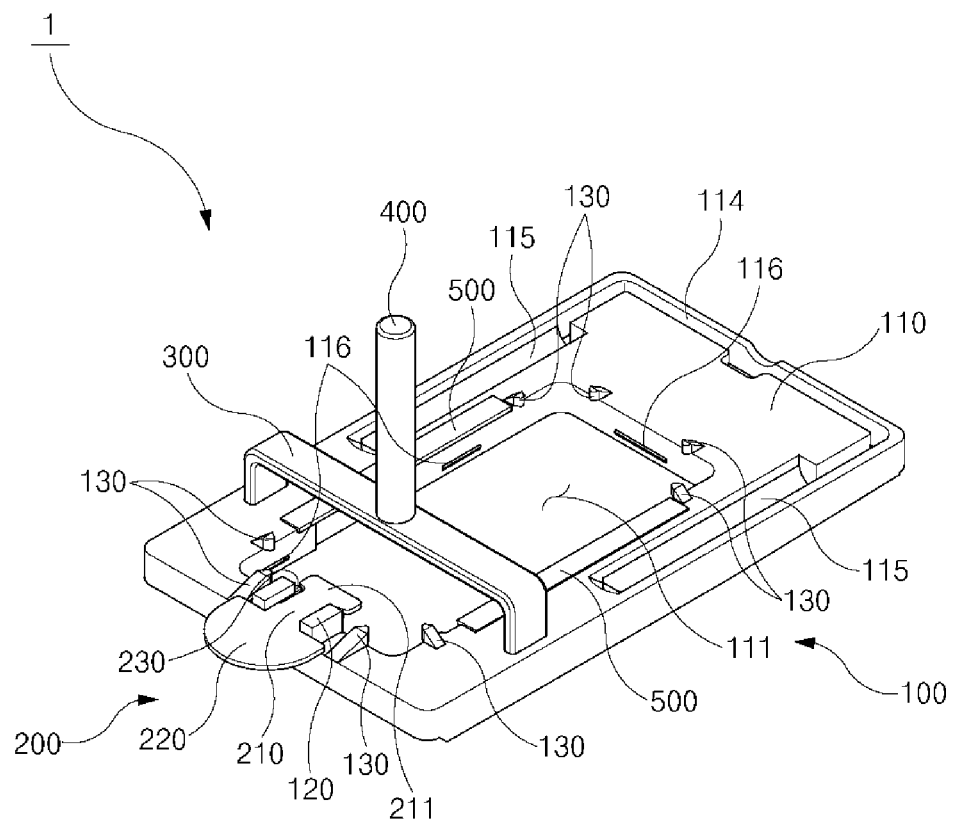
FIG. 1 is a diagram schematically illustrating a display protector attaching apparatus for a smart device according to an embodiment of the present disclosure.

In order to fully understand the present disclosure, operational advantages of the present disclosure and objects to be achieved by implementing the present disclosure, the present disclosure will be described with reference to the accompanying drawings which illustrate preferred embodiments of the present disclosure and the contents illustrated in the accompanying drawings.

Hereinafter, preferred embodiments of the present disclosure will be described in detail with reference to the accompanying drawings. Like reference numerals illustrated in the respective drawings designate like members.

Figure 2:
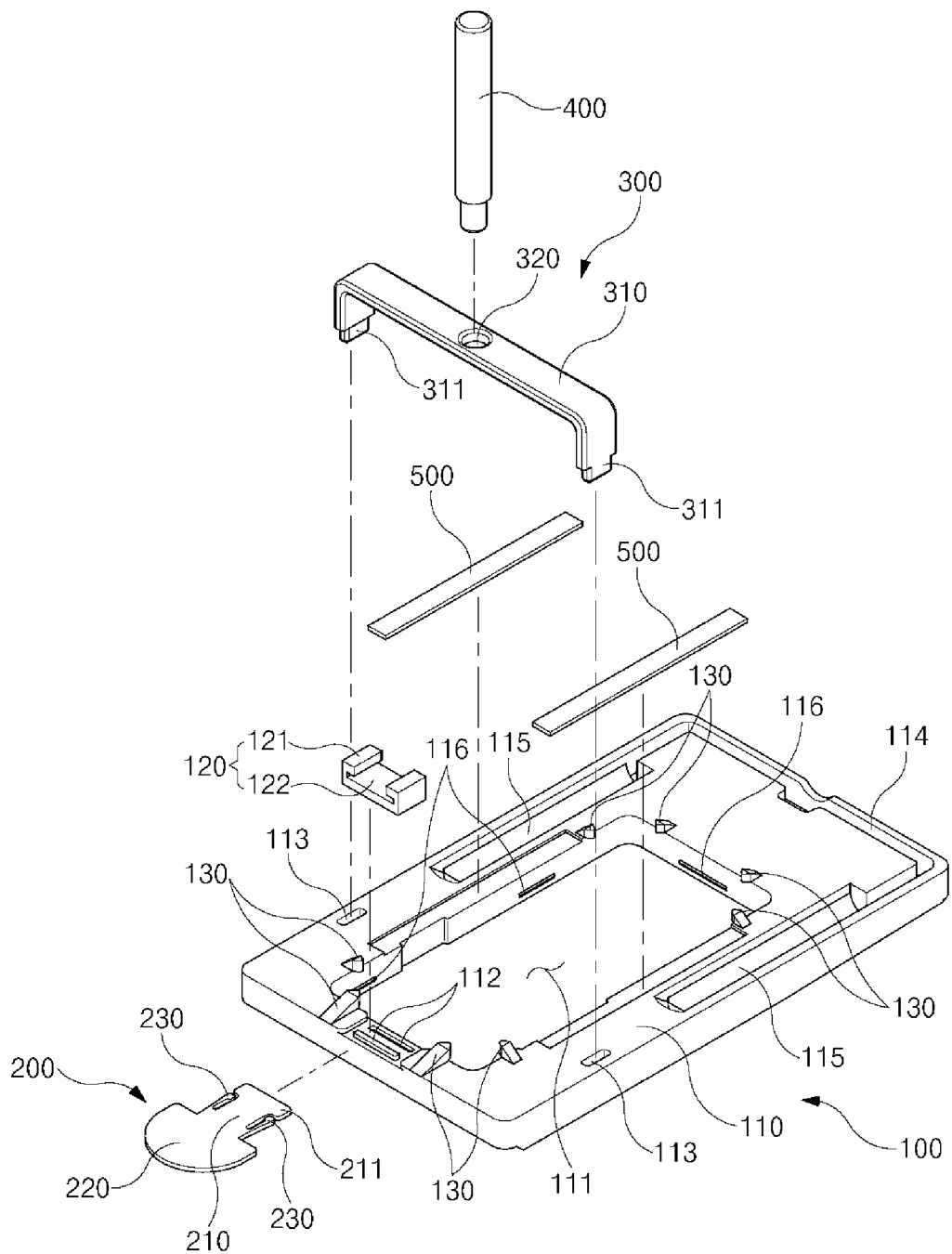
FIG. 2 is an exploded perspective view of FIG. 1.
Figure 3:
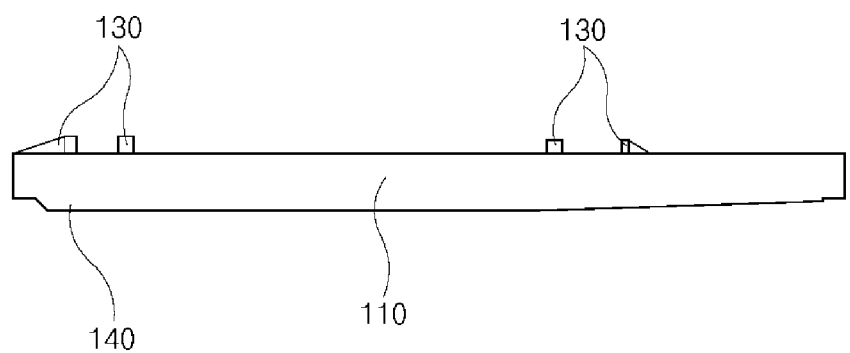
FIG. 3 is a front view of a base part illustrated in FIG. 2.
Figure 4:
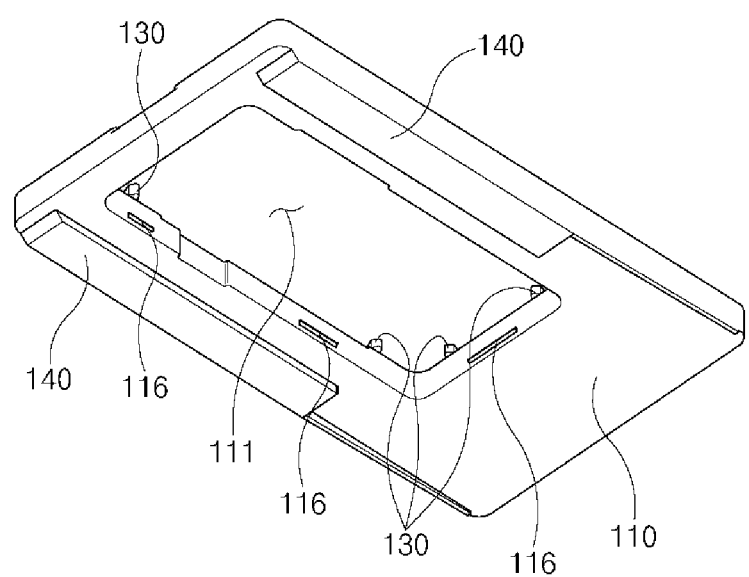
FIG. 4 is a bottom perspective view of the base part illustrated in FIG. 2.
Figure 6:
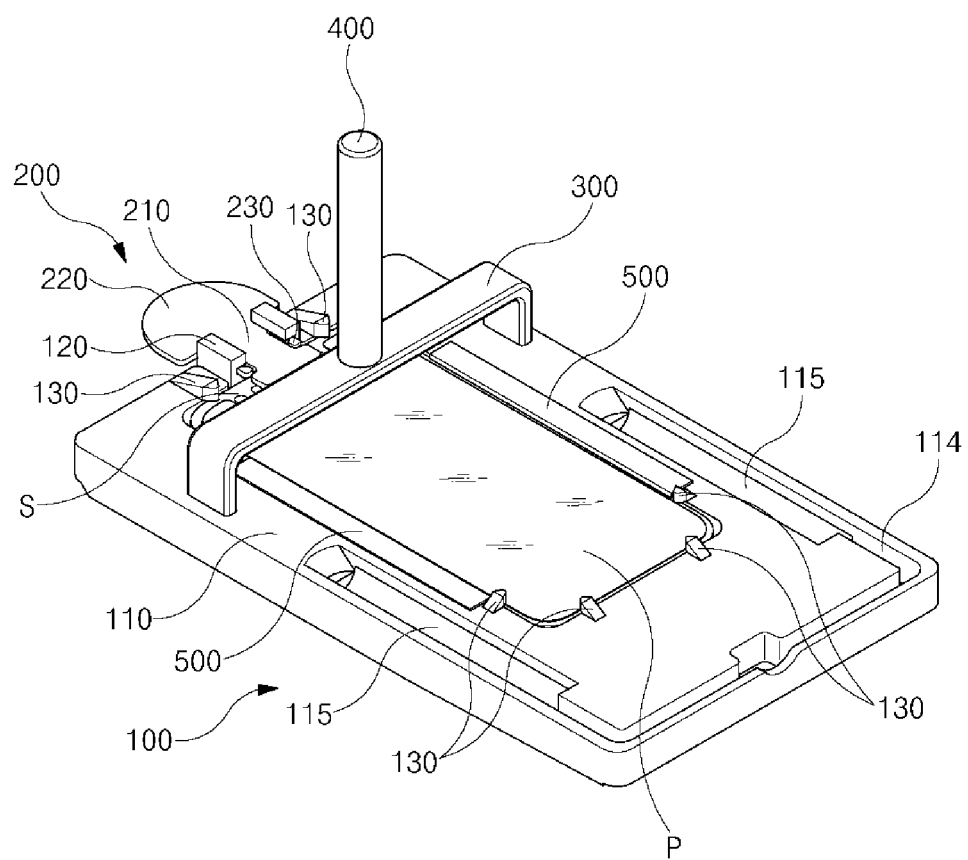
FIG. 6 is a diagram illustrating that one side of the display protector is supported to the lifting support part, as a use state of the embodiment.
Figure 7:
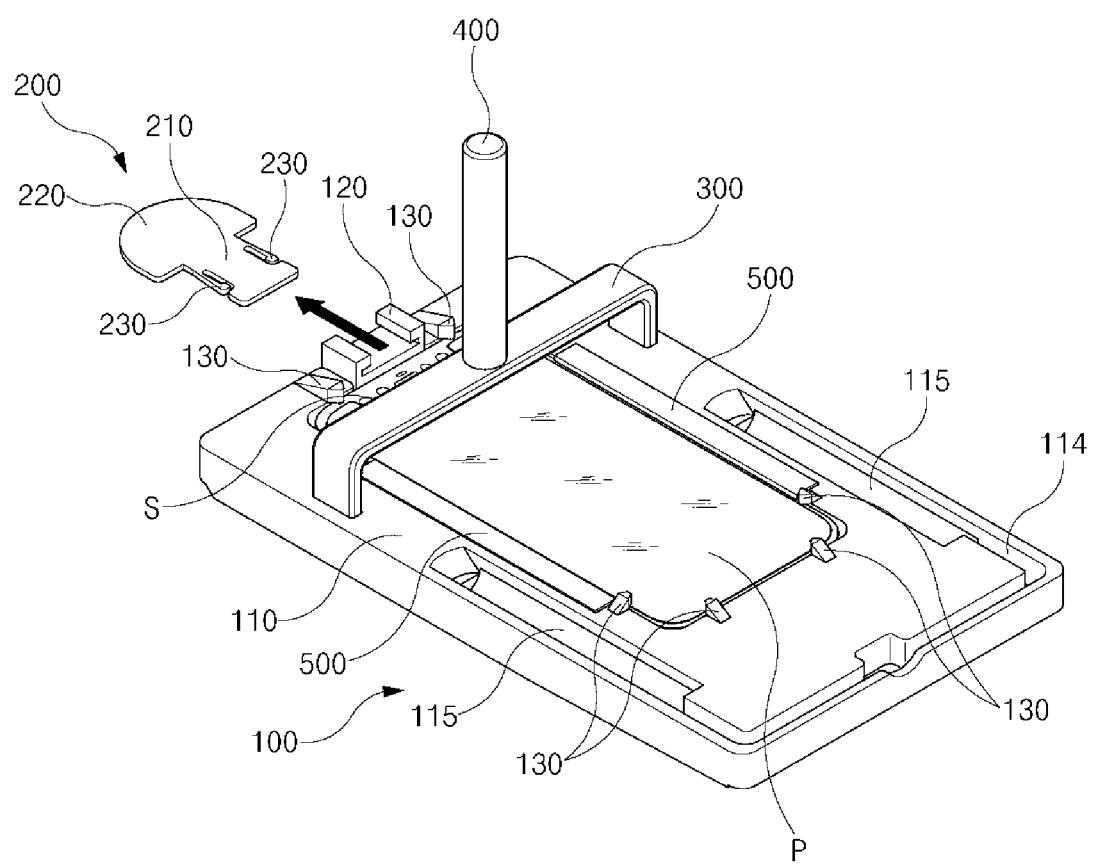
FIG. 7 is a diagram illustrating separation of the lifting support part in FIG. 6.

FIG. 1 is a diagram schematically illustrating a display protector attaching apparatus for a smart device according to an embodiment of the present disclosure, FIG. 2 is an exploded perspective view of FIG. 1, FIG. 3 is a front view of a base part illustrated in FIG. 2, and FIG. 4 is a bottom perspective view of the base part illustrated in FIG. 2. In addition, FIG. 5 is a diagram illustrating a state before a display protector is supported to a lifting support part, as an operational diagram of the embodiment, FIG. 6 is a diagram illustrating that one side of the display protector is supported to the lifting support part, as a use state of the embodiment, and FIG. 7 is a diagram illustrating separating the lifting support part in FIG. 6.

As illustrated in these drawings, a display protector attaching apparatus 1 for a smart device according to the embodiment includes a base part 100 to which a smart device S is coupled, a lifting support part 200 which is detachably coupled to the base part 100 to support a display protector P to be attached to the smart device S, a container support 300 coupled to the base part 100, a container member 400 which is coupled to the container support 300 and stored with a liquid adhesive member dropped on the display protector P, and an absorption pad 500 which is coupled to the base part 100 to absorb the liquid adhesive flowing down when the display protector P is attached to a display part of the smart device S.

Figure 5:
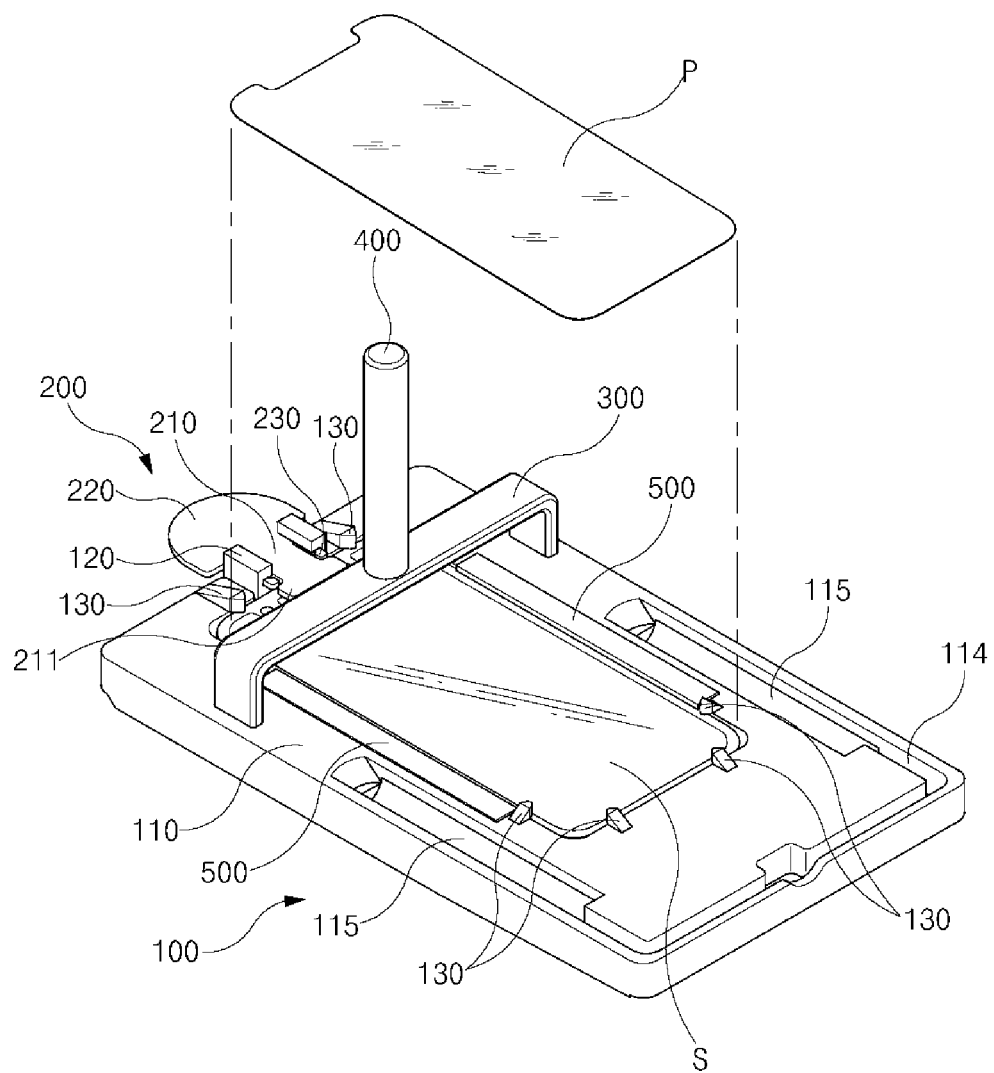
FIG. 5 is a diagram illustrating a state before a display protector is supported to a lifting support part, as an operational diagram of the embodiment.

The base part 100 is coupled with the smart device S as illustrated in FIG. 5, and as illustrated in FIG. 2, includes a base body 110, a lifting coupling part 120 which is provided on one side of the base body 110 and detachably coupled with the lifting support part 200, a plurality of align protrusions 130 which is provided on the base body 110 and aligns the display protector P to be attached to the display of the smart device S, and an inclined protrusion 140 which is provided on the bottom of the base body 110 so that the base body 110 is inclined like a seesaw.

The base body 110 of the base part 100, as illustrated in FIG. 2, may have a flat hexahedral shape provided to be elongated in a horizontal direction, and a body coupling hole 111 to which the smart device S is detachably coupled may be provided at the center thereof. In the embodiment, the smart device S may be coupled from the bottom to the top of the base body 110. In addition, in the embodiment, the smart device S may be detachably coupled to be fitted to smart device fixing protrusions 116 positioned on the upper, lower, left, and right sides in the body coupling hole 111.

The first coupling groove 112 of the base body 110 is provided in the base body 110 of a region where the lifting coupling part 120 is disposed, as illustrated in FIG. 2, to be provided as a detachably coupling space of the lifting coupling part 120.

In the embodiment, a plurality of, for example, a pair of first coupling grooves 112 may be provided to be spaced apart from each other. In the embodiment, the lifting coupling part 120 may be coupled to a first coupling groove 112 selected from the plurality of first coupling grooves 112 so as to adjust a coupling position of the lifting coupling part 120. As a result, the lifting support part 200 coupled to the lifting coupling part 120 is also shifted with the lifting coupling unit 120 to adjust a position where the lifting support part 200 supports the display protector P.

In addition, in the embodiment, on the upper surface of the base body 110, as illustrated in FIG. 2, a pair of second coupling grooves 113 may be spaced apart from each other. In the embodiment, body coupling protrusions 320 of the container support 300 may be detachably fitted to the pair of second coupling grooves 113.

Furthermore, in the embodiment, the base body 110 may be provided with a support receiving groove 114 as illustrated in FIG. 2. In the embodiment, the container support 300 illustrated in FIG. 2 may be received in the support receiving groove 114. In the embodiment, there is an advantage that the container support 300 may be conveniently stored in the support receiving groove 114 when not in use. In the embodiment, the support receiving groove 114, as illustrated in FIG. 2, may be provided in the base body 110 of a region facing the pair of first coupling grooves 112, and may have a shape corresponding to the container support 300.

In addition, in the embodiment, the base body 110 may be provided with a pair of container member receiving grooves 115 as illustrated in FIG. 2. In the embodiment, the container member 400 and the absorption pad 500 may be received in the pair of container member receiving grooves 115. In the embodiment, one side of the pair of container member receiving grooves 115 may be provided to communicate with the support receiving groove 114.

The lifting coupling part 120 of the base part 100 may be detachably coupled to the first coupling groove 112 illustrated in FIG. 2 to be provided as a detachable coupling space of the lifting support part 200.

In the embodiment, the lifting coupling part 120, as illustrated in FIG. 2, includes a coupling body 121 detachably coupled to the first coupling groove 112 selected from the plurality of first coupling grooves 112 and a support part coupling groove 122 provided in the coupling body 121 and detachably coupled with the lifting support part 200.

In the embodiment, a protrusion is provided on the bottom of the coupling body 121, and the protrusion is coupled to the first coupling groove 112 selected from the plurality of first coupling grooves 112 provided in the base part 100 to adjust the coupling position of the lifting coupling part 120.

As illustrated in FIG. 2, the align protrusion 130 of the base part 100 is provided on the base body 110 in an area adjacent to the body coupling hole 111 to adjust the align of the display protector P to be attached to the display of the smart device S.

In the embodiment, a total of eight align protrusions 130 may be provided.

As illustrated in FIGS. 3 and 4, the inclined protrusion 140 of the base part 100 may be provided on the bottom of the base body 110 to give an inclination to the base body 110.

In the embodiment, as illustrated in FIG. 3, the inclined protrusion 140 may be provided so that a region provided with a support wall 116 is high and the inclination decreases toward the right side based on FIG. 3.

In the embodiment, as illustrated in FIG. 4, a pair of inclined protrusions 140 may be provided to be spaced apart from each other.

The lifting support part 200, as illustrated in FIG. 6, is coupled to the lifting coupling unit 120 so that one side of the display protector P may be spaced apart from the display of the smart device S at a predetermined interval.

In the embodiment, as illustrated in FIG. 2, the lifting support part 200 includes a support body 210, a handle portion 220 provided at one end of the support body 210 to be provided as a handle of the user, and an elastic bar 230 provided at an edge of the support body 210 to be elastically supported to the wall portion of the support part coupling groove 122.

The support body 210 of the lifting support portion 200 may be slidably coupled to the support part coupling groove 122 provided on the lifting coupling part 120.

In the embodiment, at the end of the support body 210, as illustrated in FIG. 2, an extension portion 211 may be provided, and the extension portion 211 may be provided with a wider width than the support body 210.

The handle portion 220 of the lifting support part 200 is provided with a wider width than the extension portion 211 to be provided as a handle of the user, and may stop the support body 210 so that the support body 210 is not inserted into the support part coupling groove 122 by a predetermined depth or more.

As illustrated in FIG. 2, a pair of elastic bars 230 of the lifting support part 200 is provided at the edge of the support body 210 to be elastically supported to the wall portion of the support part coupling groove 122. As a result, it is possible to prevent the loss or unintended detachment of the lifting support part 200.

The container support 300 includes a container support body 310 to which the container member 400 is detachably coupled, and a body coupling protrusion 320 which is provided at a lower end of the container support body 310 to be fitted to the pair of second coupling grooves 113.

In the embodiment, as illustrated in FIG. 2, at the center of the container support body 310, a container coupling hole 311 is provided, and the container member 400 may be detachably fitted to the container coupling hole 311. In the embodiment, a liquid adhesive member stored in the container member 400 may be dropped on the display of the smart device S through the container coupling hole 311.

As illustrated in FIG. 1, the container member 400 may be coupled to the container support 300 to drop the stored liquid adhesive member on the display of the smart device S.

As illustrated in FIG. 1, the absorption pad 500 is coupled to a cutout groove provided in an upper surface of the base body 110 to absorb the liquid adhesive flowing down when the display protector P is attached to the display part of the smart device S.

In the embodiment, the absorption pad 500 may have a long rectangular shape in plan view.

Hereinafter, a used state of the embodiment will be briefly described with reference to FIGS. 5 to 7.

First, as illustrated in FIG. 5, after the smart device S is coupled to the base body 110, the lifting support part 200 is coupled to the lifting coupling part 120.

Next, the liquid adhesive member is dropped on a liquid crystal screen of the smart device S using the container member 400 illustrated in FIG. 1.

Thereafter, the liquid crystal screen protector P illustrated in FIG. 5 is disposed to be attached to the liquid crystal screen of the smart device S. At this time, as illustrated in FIG. 6, one side of the liquid crystal screen protector P is supported so as to be spaced apart from the upper surface of the liquid crystal screen of the smart device S by the lifting support part 200. At this time, the lower end of the liquid crystal screen protector P is supported to be inclined to the align protrusion 310 disposed at the lower end, and the base body 110 is inclined using the inclined protrusion 140 to be in contact with the liquid adhesive member.

Finally, as illustrated in FIG. 7, when the lifting support part 200 is separated from the lifting coupling part 120, the display protector P may be attached to the display of the smart device S while one side of the lifted display protector P is dropped on the display of the smart device. At this time, the liquid adhesive member on the upper surface of the display moves while spreading or flowing to the upper surface of the display due to the separation of the lifting support part 200 of which one side is supported, thereby minimizing bubbles which may occur while the display protector P is in contact with the liquid adhesive member.

As described above, the present disclosure is not limited to the embodiments described herein, and it will be apparent to those skilled in the art that various changes and modifications may be made without departing from the spirit and the scope of the present disclosure. Therefore, it will be understood that these changes and modifications are included in the appended claims of the present disclosure.

What is claimed is:

1. A display protector attaching apparatus for a smart device comprising:
    a base part provided with a body coupling hole to which a smart device is coupled and a smart device fixing protrusion; and
    a lifting support part which is detachably coupled to a lifting coupling part provided in the base part to support a display protector to be attached to the smart device,
    wherein when the lifting support part is separated from the lifting coupling part, the display protector is dropped on the display of the smart device provided with a liquid adhesive member to be attached to the display, and
    the lifting coupling part is provided to be position-adjusted in the base part so that the lifting support part adjusts a position supporting the display protector, and
    wherein the lifting coupling part includes
    a coupling body which is detachably coupled to a first coupling groove selected from the plurality of first coupling grooves provided in the base part; and
    a support part coupling groove which is provided in the coupling body and detachably coupled with the lifting support part.

2. The display protector attaching apparatus for the smart device of claim 1, wherein the lifting support part includes
a support body which is slidably coupled to the support part coupling groove provided in the lifting coupling part;
a handle portion which is provided at an end of the support body to be provided as a handle of a user; and
a pair of elastic bars which is provided at an edge of the support body to be elastically supported to a wall portion of the support part coupling groove.

3. The display protector attaching apparatus for the smart device of claim 2, wherein the lifting support part further includes an extension portion which is provided in the support body to support the display protector,
wherein the extension portion is provided with a wider width than the support body, and
the pair of elastic bars is provided in the support body between the extension portion and the handle portion.

4. The display protector attaching apparatus for the smart device of claim 1, wherein the base part includes
a base body provided with the body coupling hole and the smart device fixing protrusion; and
an inclined protrusion which is provided on the bottom of the base body to incline the base body.

5. The display protector attaching apparatus for the smart device of claim 4, wherein the base part further includes a plurality of align protrusions provided on the base body.

6. The display protector attaching apparatus for the smart device of claim 1, wherein a support receiving groove is provided in the base body of the base part, and
a container support supporting a container member is received in the support receiving groove.

7. The display protector attaching apparatus for the smart device of claim 1, further comprising:
a container support which is detachably coupled to a second coupling groove provided in the base part;
a container member which is detachably coupled to the container support to store the liquid adhesive member dropped on the display; and
an absorption pad which is attached or coupled to the base part.

8. A display protector attaching apparatus for a smart device comprising:
a base part provided with a body coupling hole to which a smart device is coupled and a smart device fixing protrusion; and
a lifting support part which is detachably coupled to a lifting coupling part provided in the base part to support a display protector to be attached to the smart device,
wherein when the lifting support part is separated from the lifting coupling part, the display protector is dropped on the display of the smart device provided with a liquid adhesive member to be attached to the display, and
the lifting coupling part is provided to be position-adjusted in the base part so that the lifting support part adjusts a position supporting the display protector, and
wherein a protrusion provided on the bottom of the lifting coupling part is coupled to a first coupling groove selected from a plurality of first coupling grooves provided in the base part so that the lifting coupling part is position-adjusted in the base part.

9. A display protector attaching apparatus for a smart device comprising:
a base part provided with a body coupling hole to which a smart device is coupled and a smart device fixing protrusion; and
a lifting support part which is detachably coupled to a lifting coupling part provided in the base part to support a display protector to be attached to the smart device,
wherein when the lifting support part is separated from the lifting coupling part, the display protector is dropped on the display of the smart device provided with a liquid adhesive member to be attached to the display, and
the lifting coupling part is provided to be position-adjusted in the base part so that the lifting support part adjusts a position supporting the display protector, and
wherein the base part includes
a base body provided with the body coupling hole and the smart device fixing protrusion; and
an inclined protrusion which is provided on the bottom of the base body to incline the base body.

10. The display protector attaching apparatus for the smart device of claim 9, wherein the base part further includes a plurality of align protrusions provided on the base body.

* * * * *